United States Patent [19]

Tamamori

[11] Patent Number: 4,957,193
[45] Date of Patent: Sep. 18, 1990

[54] ACTUATING CYLINDER HAVING MECHANICAL ADVANTAGE

[75] Inventor: Hideo Tamamori, Kobe, Japan

[73] Assignee: Nippon Air Brake Company, Kobe, Japan

[21] Appl. No.: 393,166

[22] Filed: Aug. 14, 1989

[30] Foreign Application Priority Data

Aug. 22, 1988 [JP] Japan .................. 63-208616

[51] Int. Cl.$^5$ .................. F01B 9/00; B60T 11/10
[52] U.S. Cl. .................. 188/153 R; 92/14;
   92/19; 92/29; 92/140; 92/13.4; 92/DIG. 4;
   74/110; 74/516
[58] Field of Search .................. 92/14, 29, 136, 140,
   92/30, 129, 130 R, 132, 13.4, 18, 19, 20, DIG. 4;
   74/110, 516; 188/153 R

[56] References Cited

U.S. PATENT DOCUMENTS

| | | | |
|---|---|---|---|
| 2,677,974 | 5/1954 | Willig | 74/516 |
| 2,913,071 | 11/1959 | Mueller | 188/153 R |
| 3,812,766 | 5/1974 | Weiss | 92/29 |
| 3,945,304 | 3/1976 | Taylor | 92/140 |
| 3,983,757 | 10/1976 | Nelimarkka | 74/44 |
| 4,022,304 | 5/1977 | Spalding | 188/153 R |
| 4,297,908 | 11/1981 | Zimmer | 92/118 |
| 4,352,626 | 10/1982 | Frisbee et al. | 92/15 |
| 4,609,178 | 9/1986 | Baumann | 74/516 |
| 4,649,805 | 3/1987 | Barberis | 74/110 |
| 4,684,074 | 8/1987 | Whiteley | 92/29 |
| 4,723,479 | 2/1988 | Gallentine | 92/6 R |
| 4,791,856 | 12/1988 | Heim et al. | 92/14 |
| 4,875,404 | 10/1989 | Aldrige | 74/110 |
| 4,909,360 | 3/1990 | Langley | 188/153 R |

FOREIGN PATENT DOCUMENTS

| | | | |
|---|---|---|---|
| 611755 | 1/1961 | Canada | 188/153 R |
| 1049811 | 2/1959 | Fed. Rep. of Germany | 92/29 |
| 860665 | 1/1941 | France | 92/140 |
| 7611684 | 11/1976 | France | 74/110 |
| 425045 | 9/1947 | Italy | 92/140 |
| 102096 | 11/1923 | Switzerland | 92/140 |
| 2077896 | 12/1981 | United Kingdom | 92/140 |

*Primary Examiner*—Carl D. Price
*Assistant Examiner*—Thomas Denion
*Attorney, Agent, or Firm*—G. J. Falce

[57] ABSTRACT

An actuating cylinder having a fluid pressure operated piston member connected by a friction member to a push rod to which a brake shoe, or the like, may be attached as the output member. A force transfer lever is arranged between the piston and push rod to transmit the piston force to the output member with mechanical advantage only after the friction connection is overcome by resistance at the push rod, such as occurs by engagement of the brake shoe with the wheel of a railway vehicle.

20 Claims, 5 Drawing Sheets

FIG. 1
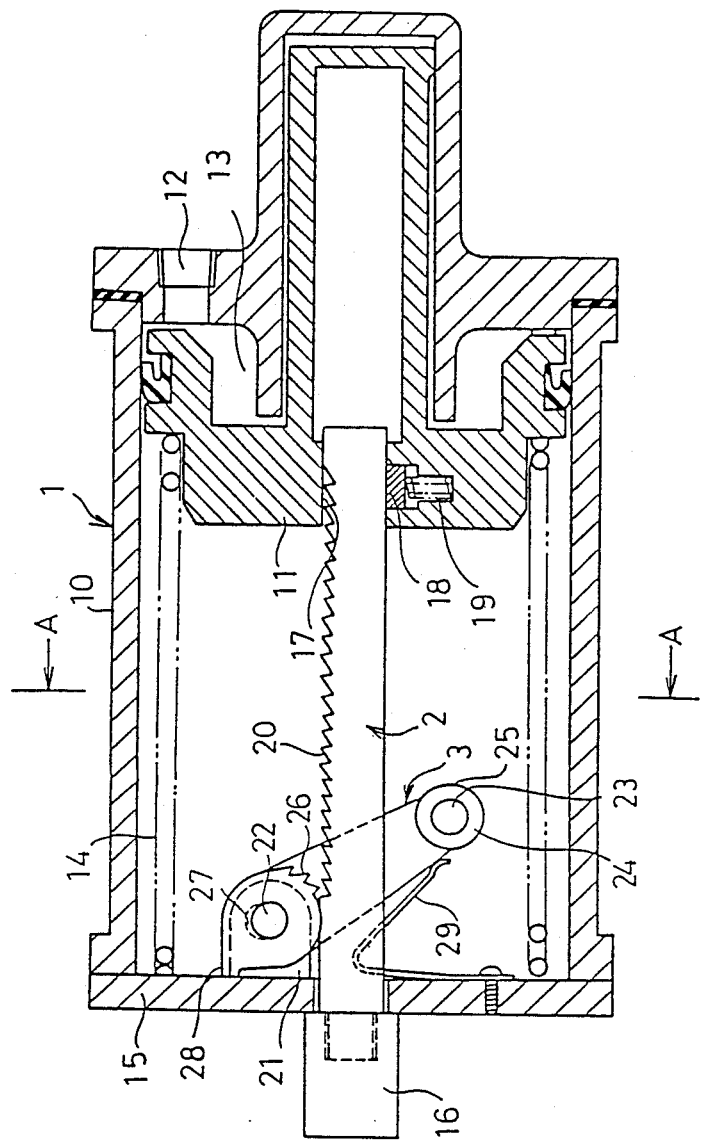
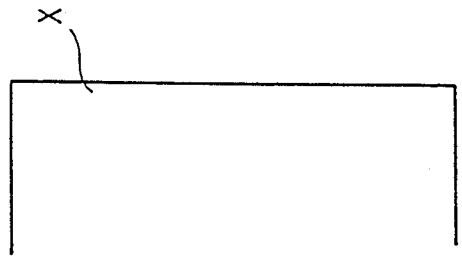

ACTUATING CYLINDER HAVING MECHANICAL ADVANTAGE

BACKGROUND OF THE INVENTION

This invention relates to a force multiplication system for a brake cylinder or the like and more particularly to such a force multiplication system employing a force lever that is only activated following engagement of the brake shoe with the object to be braked, such as a railway vehicle wheel.

The prior art includes systems of this type, e.g., the one indicated in the Utility Model Kokai No. 59-132467. An outline of this system of the prior art is shown in FIG. 6, and it will be explained first. In the FIG., 31 is the cylinder part, 32 is the push rod, 33 is the lever, 34 is the brake shoe and 35 is the wheel. When the compressed air is fed into the cylinder part 31 via the inlet-outlet 31a, the piston 31c moves to the left in the figure against the resistance of the return spring 31b. In this manner, the lever 33 moves around the fulcrum pin 33b in the counter-clockwise direction via the piston rod 31d and the coupling pin 33a. As a result of this movement of the lever 33, the push rod 32 is driven to the left via the space adjuster 32b located on the push rod 32 which is engaged with the middle part of the lever 33. This driving force is increased as a function of the lever ratio of the lever 33, and it strongly presses the brake shoe 34 to the wheel 35.

When the compressed air in the cylinder part 31 is discharged from the inlet-outlet 31a, the piston 31c moves to the right as a result of the reaction force of the return spring 31b, and consequently, the lever 33, the push rod 32, the brake shoe 34, etc., return to their original positions shown in the figure.

In the brake system of the prior art described above, if the brake shoe 34, by engagement with push rod 32, moves forward toward the side of the wheel 35, and performs the braking action, an increase of the braking force exerted by the lever 33 is required only when the brake shoe 34 touches the wheel 35. Nevertheless, the push rod 32 is always driven via the lever 33 at the cylinder part 31, even prior to brake shoe/wheel engagement. If the stroke required to move the push rod 32 is $S_1$, the stroke required at the time of braking is $S_2$, and the lever ratio is $\alpha$, the total stroke of the piston 31c of the cylinder part 31 becomes $(S_1+S_2)(\alpha)$, and the stroke multiplied by the lever ratio of the push rod 32 is necessary. Therefore, the piston 31c of cylinder part 31 has an unnecessarily large stroke, and the cylinder part 31 therefore must be large in size to accommodate such a large stroke, which is a problem.

SUMMARY OF THE INVENTION

The object of the present invention is to provide a relatively small, compact, fluid pressure operated brake cylinder device suitable for railway type braking service by virtue of withholding application of the piston power stroke via a force amplification lever until such time as the brake shoes are in braking engagement with the vehicle wheels.

Briefly, the foregoing objective is attained through a force transfer mechanism including a fluid pressure actuated piston member that is movable from a retracted position in a brake cylinder to an operative position in which a brake shoe is engaged with a wheel of a vehicle to be braked. The piston push rod is connected at one end to the brake shoe and at the other end to the piston, there being a friction connection therebetween. Until such time as the piston encounters resistance due to brake shoe/wheel engagement, the piston and push rod move in unison without any mechanical advantage, thereby minimizing the piston stroke. A force lever is angularly disposed relative to the push rod and is engageable therewith at a location intermediate the lever ends, the lever being fulcrumed at one end and engageable with the piston at its other end. Once brake shoe/wheel engagement occurs and the friction connection between the piston and push rod is lost, the piston is free to move relative to the push rod and, by virtue of its engagement with the force lever, transmits braking force to the brake shoe with mechanical advantage corresponding to the lever ratio.

BRIEF EXPLANATION OF THE DRAWINGS

These and other objects and advantages of the invention will be apparent from the following more detailed explanation when taken in connection with the drawings in which:

FIG. 1 is a sectional elevation view of a cylinder device including a force multiplying arrangement, as one example of the invention, the various components being shown in a retracted position;

DESCRIPTION AND OPERATION

Figure 6:
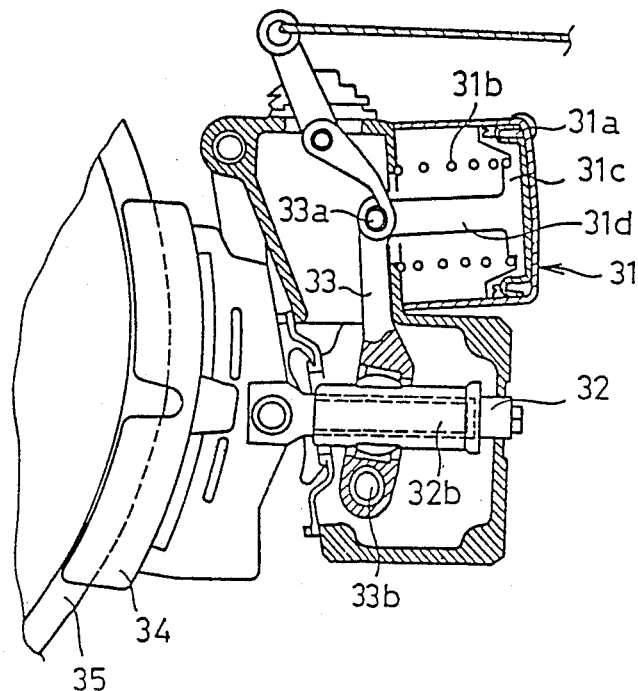
FIG. 6 is a partial sectional elevation view of an example of the prior art.
Figure 2:
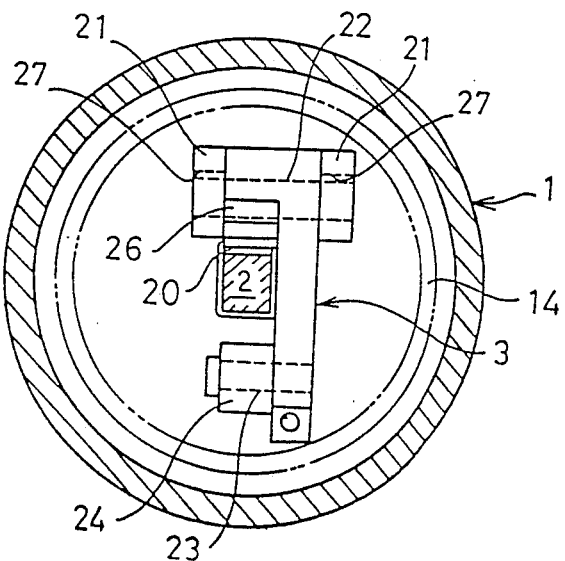
FIG. 2 is a cross-section view taken along the lines 2—2 in FIG. 1.
Figure 3:
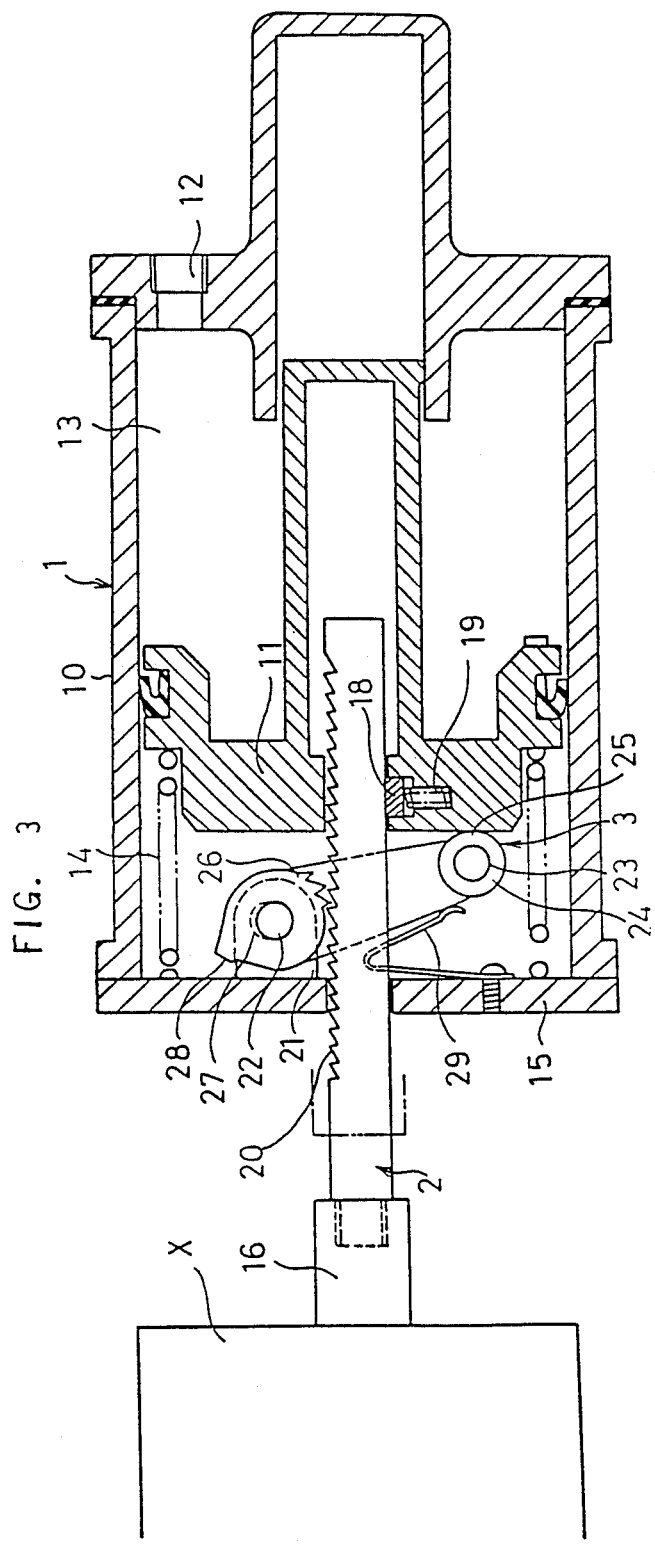
FIG. 3 is a sectional elevation view of the cylinder of FIG. 1, with the various components being shown in an applied position.

The first embodiment of this invention is shown in FIG. 1 to FIG. 3. In the FIGS., 1 is an air pressure cylinder, 2 is a push rod, and 3 is a force lever.

The air pressure cylinder 1 includes a piston 11 that is housed in the cylinder main body 10. In the state illustrated in FIG. 1, when the compressed air is fed from the inlet-outlet 12 into the pressure chamber 13, the piston 11 moves forward (to the left in the figure) against the force of a return spring 14, and assumes the position illustrated in FIG. 3. When the compressed air is discharged from the pressure chamber 13, the piston 11 returns to the right by the reaction of the return spring 14, and assumes the position indicated in FIG. 1.

The push rod 2 penetrates the left end wall 15 of the cylinder main body 10, as can be seen in FIG. 1, along the axial line of the cylinder main body 10 so that it can move, and its outer end is the output part 16. The right side end of the push rod in the cylinder main body 10 enters the inner hole 17 of the piston 11 which moves back (to the right), and the inner hole 17 and the push rod 2 are frictionally engaged in the direction of movement of the piston 11 The frictional engagement is achieved by a structure in which a friction member 18 presses against the push rod 2 from the inner surface of the inner hole 17 by means of a spring 19. If the resistance to movement of the push rod 2 is low when the piston 11 moves, it moves with the push rod 2, and if the resistance is large, the push rod 2 slides over the friction member 18, and only the piston 11 moves. In addition, there is a toothed gear rack in the middle part of the push rod 2 which provides an engagement part 20, the shape of the gear rack teeth being such that the left side of the tooth profile is sloped and the right side is vertical, as in saw teeth.

Force lever 3 is placed near the end wall 15 in the cylinder main body 10. One end of the lever is supported by a fulcrum pin 22 at a pin supporting part 21 that protrudes from the end wall 15 and extends in a downwardly angled direction passing along the side of the push rod 2. The extended end of lever 3 holds a roller 24 by a pin 23, which is parallel to the fulcrum pin 22, to form the power point 25. When the piston 11 in FIG. 1 moves forwrd (to the left), it touches this power point part 25, and applies pressure to it. In addition, there is an engagement part 26, which is a sector of sawtooth shaped teeth on the circumference of the lever part that is supported by the fulcrum pin. These sector gear teeth are adapted to mesh with the teeth of the rack of the push rod 2. The position where the teeth mesh becomes the work point. The sector gear teeth securely mesh with the teeth of the gear rack when the power point part 25 of the lever 3 is pushed forward by the piston 11, but when the push rod 2 is moving forward, the sloped side of the respective teeth are brought into contact and the lever 3 is pushed up through ratchet action and the engagement is discontinued. For this purpose, the axis hole 27 of the supporting part 21, which supports the fulcrum pin 22 has an oblong shape, being enlarged in a vertical direction, as viewed in the drawing. In the FIGS., 28 is a stopper on the lever 3, and 29 is a leaf spring. The system in FIG. 1 is in a normal stand-by state in which piston 11 is forced to its retracted position by spring 14 and lever 3 is set by the spring 29 in the position established by the stopper 28

To use the force applying mechanism as a device to apply a pressing force to object X, it should be installed so that the tip of the output part 16 moves forward and touches the object X. When compressed air is supplied from the inlet-outlet 12 in the state of FIG. 1, the piston 11 moves forward and assumes the position illustrated in FIG. 3. Concerning this process, first, when the piston 11 begins to move forward, it can move forward with nearly no resistance since the output part 16 of the push rod is separated from the object X; therefore, the piston 11 moves forward together with the frictionally engaged push rod 2. Then, when the output part 16 of the push rod 2 touches the object X, the forward movement of the push rod 2 stops and only the piston 11 moves forward, and the front surface of the piston 11 touches the power point part 25 of the lever 3 and pushes it. Consequently, the lever 3 rotates around the fulcrum pin 22, and the sector gear teeth in the engagement part 26 mesh with the teeth of the rack of the engagement part 20. Lever 3 thus drives the push rod 2 forward with force multiplication so that the output part 16 engages object X with high force, and assumes the position illustrated in FIG. 3.

When the compressed air is discharged from the inlet-outlet 12, in nearly the reverse order of the above description, piston 11 is returned to its retracted position, as indicated in FIG. 1, by the reaction force of the return spring 14, and the leaf spring 29 returns lever 3 to its normal position, as established by stopper 28.

Figure 4:
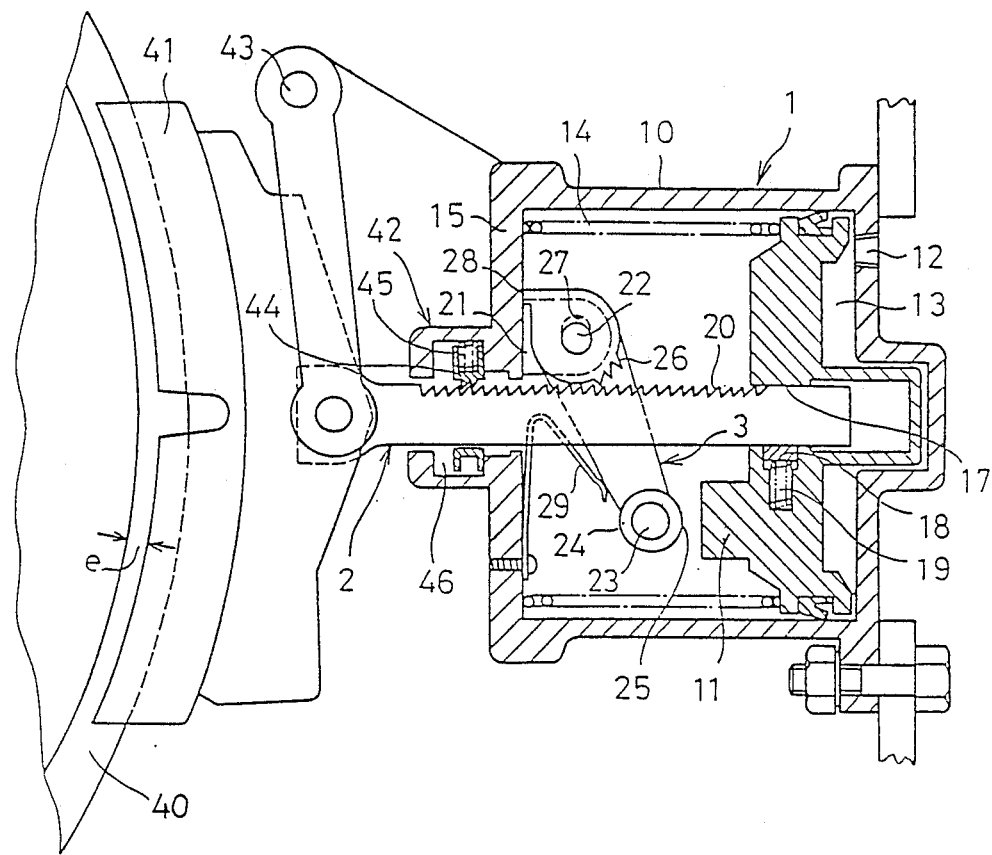
FIG. 4 is a partial section elevation view of a cylinder device including a force multiplying arrangement, as a second example of the invention, the various components being shown in a retracted position.
Figure 5:
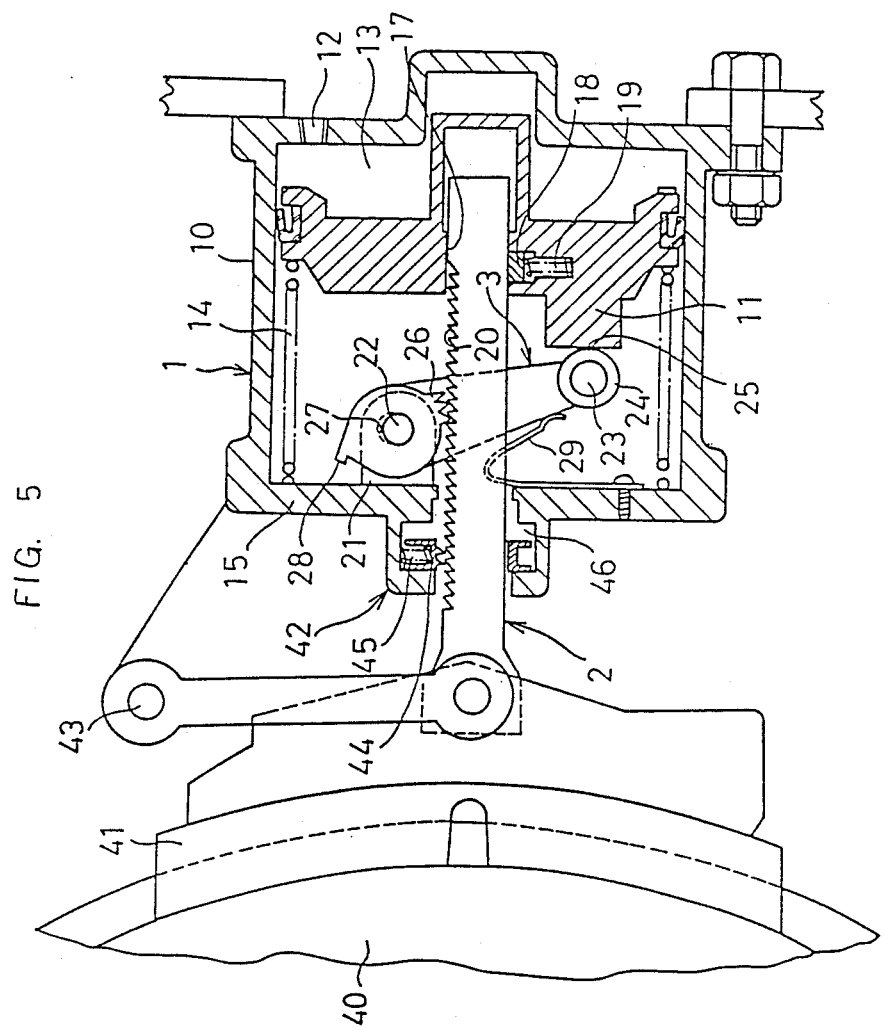
FIG. 5 is a sectional elevation view of the cylinder of FIG. 4, with the various components being shown in an applied position.

The second embodiment of the invention is shown in FIG. 4 and FIG. 5. The difference from the first embodiment is that the object X is a wheel 40, and the output part 16 is a brake shoe 41, and a separate gap adjuster 42 is provided.

The wheel 40 is that of a railroad car. The brake shoe 41 is suspended by a brake shoe hanger 43 in a position near the wheel 40, and at the same time, it is connected to the tip of the push rod 2. The gap adjuster 42 is located on the cylinder end wall 15, and has a ratchet 44 which meshes with the rack of the push rod 2 and limits the backward movement (to the right in the figure) of the pus rod 2. The ratchet 44 is urged by a spring 45 so that it meshes with the teeth of the rack, and it is housed in the adjusting chamber 43 so that it can move the distance equal to the desired gap between the wheel 40 and the retracted brake shoe 41, in the direction of movement of the push rod. This gap adjuster 42 maintains the gap distance between the wheel 40 and the retracted brake shoe 41 substantially constant by limiting the backward movement of the push rod 2, as the brake shoe wears during use. By the way, the gap distance between the power point 25 of the lever 3 and the front end surface of the piston 11 in the retracted position of piston 11 is slightly larger than the gap distance between the wheel 40 and the brake shoe 41. Consequently, when the piston moves forward with the push rod 2, the brake shoe 41 touches the wheel 40 first, and then the piston 11 touches the power point 25 and drives the push rod 2 forward via the lever 3, and a high braking force is generated.

The other parts are the same as those in the first embodiment, and are identified by the same reference numbers. No further explanation of these items is deemed necessary.

In addition, the force applying mechanism can be used not only in the brake system but also in the driving system of a press.

In accordance with the foregoing, the piston accompanies the push rod in the forward movement until the output member touches the object, thereupon engaging the force lever to achieve mechanical advantage. The piston stroke is relatively short compared with the case in which the push rod is moved forward via the lever throughout the full stroke to obtain the desired high output force Therefore, the piston stroke can be short, so that the amount of pressure medium which has to be fed into the cylinder can be small, and the entire driving system including the pressure medium operating device can be reduced in size.

In addition, in a brake system, the cylinder part and the push rod are designed as one body, so that the brake system itself can be given a compact size. At the same time, the cylinder part can also be retuced in size, the peripheral equipment related to the brake system can be reduced in size, and the overall size of the system can be reduced, which contributes to reducing the weight of the railroad car.

I claim:
1. A fluid pressure actuating cylinder comprising:
   (a) a piston member housed in the body of said cylinder and movable from a retracted position to an operative position in response to the supply of fluid pressure thereto to provide an input force;
   (b) a push rod having one end projecting through one end wall of said cylinder body for axial movement with said piston member, said one end including an output member;

(c) means for frictionally connecting said push rod to said piston member until such time as said push rod encounters a resistance force greater than the force exerted by said friction connecting means;

(d) a force lever angularly disposed relative to said push rod and engageable therewith at a point intermediate the ends thereof;

(e) a fulcrum pin on which said force lever is rotatably mounted at its one end, the other end of said force lever being engageable with said piston member to transmit said input force from said piston member to said push rod via said force lever in the absence of said frictional connection between said piston member and said push rod.

2. A fluid pressure actuating cylinder as recited in claim 1, wherein the distance between said fulcrum pin and said point of engagement of said force lever with said push rod is less than the distance between said fulcrum pin and the point of engagement of said other end of said force lever with said piston member.

3. A fluid pressure actuating cylinder as recited in claim 2, further comprising:

(a) said push rod having a toothed gear rack; and (b) said force lever having a toothed sector gear, the respective teeth of said gear rack and sector gear being adapted to mesh to provide said engagement between said force lever and said push rod.

4. A fluid pressure actuating cylinder as recited in claim 3, further characterized in that the teeth of said gear rack and said sector gear are sawtooth-shaped.

5. A fluid pressure actuating cylinder as recited in claim 4, further characterized in that that said force lever has a normal position in which the teeth of said sector gear are disengaged from the teeth of said gear rack until such time as said force lever is rotated about said fulcrum pin by engagement of said piston member with said other end thereof.

6. A fluid pressure actuating cylinder as recited in claim 4, further characterized in that the sloped surface of the sawtooth-shaped teeth of said gear rack and said sector gear are engageable prior to the time said piston member engages said other end of said force lever.

7. A fluid pressure actuating cylinder as recited in claim 6, further comprising means for supporting said fulcrum pin to permit disengagement of said sector gear teeth from said gear rack teeth in response to said engagement of said sloped surface of the respective gear rack and sector gear teeth during said movement of said piston member from said retracted position prior to engaging said other end of said force lever.

8. A fluid pressure actuating cylinder as recited in claim 7, wherein said force lever further comprises a boss at said one end thereof, said sawtooth-shaped teeth of said sector gear being formed on the circumference of said boss.

9. A fluid pressure actuating cylinder as recited in claim 8, wherein one of said means for supporting said fulcrum pin and said one end of said lever including said boss is formed with an oblong-shaped opening in which said fulcrum pin is provided with limited free movement in the direction of elongation of said oblong opening to permit said disengagement of said sector gear teeth from said gear rack teeth.

10. A fluid pressure actuating cylinder as recited in claim 2, further comprising a roller rotatably connected to said other end of said force lever, said piston member being engageable with said force lever through said roller.

11. A fluid pressure actuating cylinder as recited in claim 10, further comprising a pin axle connecting said roller to said other end of said force lever, said pin axle lying in parallel relationship with said fulcrum pin.

12. A fluid pressure actuating cylinder as recited in claim 1, wherein said output member is a brake shoe adapted to provide braking force on a railway car wheel in said operative position of said piston member.

13. A fluid pressure actuating cylinder as recited in claim 12, further comprising wear compensating means for limiting retraction of said brake shoe during movement of said piston member from said operative position to said retracted position.

14. A fluid pressure actuating cylinder as recited in claim 13, wherein said wear compensating means comprises:

(a) a recess in the body of said actuating cylinder; and (b) a ratchet member housed in said recess having teeth engageable with said gear rack teeth during movement of said push rod toward said retracted position, said teeth of said ratchet member being disengageable from said gear rack teeth during movement of said push rod toward said operative position.

15. A fluid pressure actuating cylinder as recited in claim 14, further characterized in that the axial dimension of said recess is greater than the corresponding dimension of said ratchet member by an amount that determines said limited retraction of said brake shoe.

16. A fluid pressure actuating cylinder as recited in claim 15, further comprising stop means for limiting rotation of said force lever in one direction such as to establish a predetermined axial position of said other end of said force lever relative to said piston member in said retracted position thereof.

17. A fluid pressure actuating cylinder as recited in claim 16, wherein said other end of said force lever is spaced axially from said piston member in said retracted position of said piston member.

18. A fluid pressure actuating cylinder as recited in claim 17, wherein the distance said other end of said force lever is spaced from said piston member in said retracted position thereof is at least as great as said amount said dimension of said recess exceeds said dimension of said ratchet member.

19. A fluid pressure actuating cylinder as recited in claim 18, further comprising first spring means between said piston member and the body of said actuating cylinder for urging said piston member toward said retracted position.

20. A fluid pressure actuating cylinder as recited in claim 19, further comprising second spring means between said force lever and said body of said actuating cylinder for effecting said rotation of said force lever in said one direction.

* * * * *